United States Patent
Jentz et al.

(10) Patent No.: US 9,664,079 B2
(45) Date of Patent: May 30, 2017

(54) CRANKCASE INTEGRITY BREACH DETECTION

(71) Applicant: Ford Global Technologies, LLC, Dearborn, MI (US)

(72) Inventors: Robert Roy Jentz, Westland, MI (US); John Eric Rollinger, Troy, MI (US); Rommel Racelis, Ann Arbor, MI (US); Michael Stephen Sweppy, Manchester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

(21) Appl. No.: 14/838,076

(22) Filed: Aug. 27, 2015

(65) Prior Publication Data

US 2016/0097355 A1 Apr. 7, 2016

Related U.S. Application Data

(60) Provisional application No. 62/059,727, filed on Oct. 3, 2014.

(51) Int. Cl.
| | |
|---|---|
| F02M 35/10 | (2006.01) |
| F01M 13/00 | (2006.01) |
| F01M 13/02 | (2006.01) |
| F01M 11/10 | (2006.01) |
| F02M 25/06 | (2016.01) |
| F02D 41/00 | (2006.01) |
| F02D 41/22 | (2006.01) |

(52) U.S. Cl.
CPC .......... *F01M 13/021* (2013.01); *F01M 11/10* (2013.01); *F01M 13/00* (2013.01); *F02D 41/003* (2013.01); *F02D 41/22* (2013.01); *F02M 25/06* (2013.01); *F02M 35/1038* (2013.01)

(58) Field of Classification Search
CPC ....... F02M 35/10386; F02M 35/10222; F02M 35/1038; F02M 25/0818; F02M 25/0809; F02M 25/08; F02M 25/06; F02M 25/0827; F01M 2013/0083; F01M 13/04; F01M 13/021; F01M 13/00; F01M 11/10; F01M 1/04; F01M 1/16; F01M 1/18; F01M 1/20; F02D 41/22; F02D 41/003; F02D 41/0025; F02D 2250/08
USPC .............. 701/113, 101; 123/41.86; 73/19.05, 73/23.27, 23.29, 24.04, 25.04, 28.03, 73/29.01, 31.04
See application file for complete search history.

(56) References Cited

U.S. PATENT DOCUMENTS

| | | | | |
|---|---|---|---|---|
| 5,792,949 A | * | 8/1998 | Hewelt ................. | G01M 3/025 123/41.86 |
| 6,401,520 B1 | * | 6/2002 | Volkwein ............. | G01N 1/2205 73/28.03 |

(Continued)

*Primary Examiner* — Thomas Moulis
*Assistant Examiner* — George Jin
(74) *Attorney, Agent, or Firm* — Julia Voutyras; McCoy Russell LLP (57) ABSTRACT

Methods and systems are provided for using a crankcase vent tube pressure or flow sensor for diagnosing a location and nature of crankcase system integrity breach. Integrated CVT pressure readings are used to diagnose disconnection of the CVT on the air intake side and distinguish from disconnection on the crankcase side. Use of integrated pressure readings allows for a more reliable and quicker diagnosis even at lower engine airflows.

20 Claims, 7 Drawing Sheets

(56) References Cited

U.S. PATENT DOCUMENTS

| | | | |
|---|---|---|---|
| 8,989,992 B2* | 3/2015 | Lippok | B60T 13/662 |
| | | | 701/112 |
| 9,068,486 B2 | 6/2015 | Rollinger et al. | |
| 2005/0022795 A1* | 2/2005 | Beyer | F01M 11/10 |
| | | | 123/516 |
| 2009/0211545 A1* | 8/2009 | Satou | F01M 13/0011 |
| | | | 123/41.86 |
| 2010/0147270 A1* | 6/2010 | Pursifull | F01M 1/16 |
| | | | 123/521 |
| 2014/0076249 A1 | 3/2014 | Rollinger et al. | |
| 2014/0081549 A1* | 3/2014 | Rollinger | F01M 13/00 |
| | | | 701/101 |
| 2014/0081550 A1 | 3/2014 | Jentz et al. | |
| 2014/0081551 A1 | 3/2014 | Rollinger et al. | |
| 2014/0081564 A1* | 3/2014 | Pursifull | F02M 35/10222 |
| | | | 701/113 |

\* cited by examiner

CRANKCASE INTEGRITY BREACH DETECTION

CROSS REFERENCE TO RELATED APPLICATIONS

The present application claims priority to U.S. Provisional Patent Application No. 62/059,727, entitled "Crankcase Integrity Breach Detection," filed Oct. 3, 2014, the entire contents of which are hereby incorporated by reference for all purposes.

BACKGROUND/SUMMARY

Engines may include crankcase ventilation systems to vent gases out of the crankcase and into an engine intake manifold to provide continual evacuation of gases from inside the crankcase in order to reduce degradation of various engine components in the crankcase. During certain conditions, such as during OBD routines, crankcase ventilation systems may be monitored to identify breaches in the system. For example, a fresh air hose (also referred to as breather tube or crankcase vent tube) may become disconnected, an oil cap may be off or loose, a dipstick may be out, and/or other seals in the crankcase ventilation system may be broken resulting in degradation of various components included in the crankcase.

Various approaches may be used to monitor crankcase ventilation system integrity. For example, diagnostic blow-by approaches may be used wherein a pressure sensor used in the crankcase and a valve in a PCV fresh air hose are opened and a breach in the system is determined based on resulting changes in crankcase pressure or vacuum. Another example approach, shown by Pursifull et al. in US 2014/0081549, relies on a crankcase vent hose pressure sensor to detect disconnection of the vent tube/hose. Specifically, a measured pressure drop in the hose is correlated with air flow rate through an air induction system throttle, and the correlation is used to diagnose crankcase vent tube (CVT) disconnection. Still other approaches may use a combination of pressure sensors positioned at different locations in the crankcase ventilation system to monitor crankcase ventilation system integrity.

However, the inventors herein have recognized potential issues with such approaches. As one example, the system of Pursifull et al. requires large air intake system flow rates (e.g., higher than 12 lbm/min) to robustly detect a vent tube disconnected at the air induction system end. As such, for some power-to-weight ratio vehicles, it may be difficult to achieve the required high air flows during standard OBD demonstration cycles. As a result, the vehicle may be unable to complete the crankcase vent tube diagnostic required for meeting federal emissions standards. As another example, the system of Pursifull relies on seeing a transient dip in crankcase vent tube pressure during engine cranking and run-up to diagnose that the vent tube is connected at the crankcase end. The transient dip is generated due to the PCV valve opening during increased intake manifold vacuum creation at the engine run-up. However, variation in engine run-ups can cause variations in the transient dip. In some circumstances, the PCV valve may not open enough for the pressure sensor in the vent tube to detect the transient dip. As such, these events can lead to misdetection of a disconnected hose.

Further still, the various approaches may necessitate additional hardware to perform the monitoring, such as additional sensors and valves, thereby increasing costs and complexity. As another example, based on the location of the sensor, some combinations of pressure sensors may read substantially the same pressure under certain conditions, leading to an increase in redundancy without an increase in the accuracy of the diagnostic routine.

In one approach, to at least partially address these issues, a method for an engine is provided. The method comprises indicating crankcase ventilation system breach based on an integrated value of an error in change of actual crankcase vent tube pressure over a duration of transient engine airflow relative to an integrated value of an error in change of expected crankcase vent tube pressure over the duration. In this way, disconnection of the crankcase vent tube (CVT) on the air intake side (or clean side) may be reliably determined during an OBD cycle.

As an example, during transient engine airflow conditions when airflow is at or above a threshold flow (e.g., at or above 5 lbm/min), actual CVT pressure readings may be collected and monitored. The actual CVT pressure readings may be estimated by a pressure sensor (or flow sensor or venturi) connected in the CVT. In addition, expected CVT pressure readings corresponding to each collected actual CVT reading may be estimated based on engine operating conditions such as engine airflow and barometric pressure. The slope of each collected actual CVT reading may be compared to the slope of the corresponding estimated CVT reading. If the slopes do not match due to slopes of differing signs (e.g., one is increasing while the other is decreasing, or vice versa), the collected actual CVT reading may be rejected and not used for integration. In addition, if the engine airflow transiently falls below the threshold flow, actual CVT readings collected during the below threshold flow condition may also be rejected and not used for integration analysis. As such, while the actual CVT readings are being collected, the expected CVT readings may be integrated until a threshold value is reached. The threshold value may be indicative of a minimum amount of airflow having passed through the tube for reliable integration analysis to be performed. Thus, when the integrated value of the expected CVT readings reach the threshold value, further collection of actual CVT readings is discontinued and the actual readings (not including the rejected readings) are integrated. The integrated actual value is then adjusted with a gain factor and a noise floor to improve the weighting contribution of the CVT pressure sensor. A ratio of the integrated value of the actual readings to the integrated value of the expected readings is determined, the ratio normalized and clipped (e.g., between 0 and 1). In response to the ratio being lower than a threshold, e.g., closer to 0, it may be determined that the CVT is disconnected on the air intake side (the clean side). Accordingly, a diagnostic code may be set and engine operation may be adjusted to compensate for the disconnected CVT. For example, engine boost may be limited. If the ratio is higher than the threshold, e.g., closer to 1, it may be determined that the CVT is connected on the air intake side and no crankcase breach is indicated.

In this way, crankcase ventilation system breaches may be better identified. Further, breaches at the AIS end (the clean side) of the crankcase vent tube/hose may be better distinguished from breaches at the crankcase end. By integrating CVT pressure readings collected over a duration of steady-state engine airflow, crankcase ventilation system breaches at the air intake system (AIS) end of the CVT may be robustly identified even at lower air mass regions (e.g., above 5 lbm/min). As such, this allows the breach detection to be reliably completed both while the vehicle is travelling on the road, as well as during OBD cycles. By using the existing sensors to diagnose crankcase system degradation, the number of sensors and valves employed in a crankcase ventilation monitoring system may potentially be reduced, providing cost and complexity reduction benefits. Further, the approach allows the crankcase ventilation system to remain active during a diagnostic procedure.

It should be understood that the summary above is provided to introduce in simplified form a selection of concepts that are further described in the detailed description. It if is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
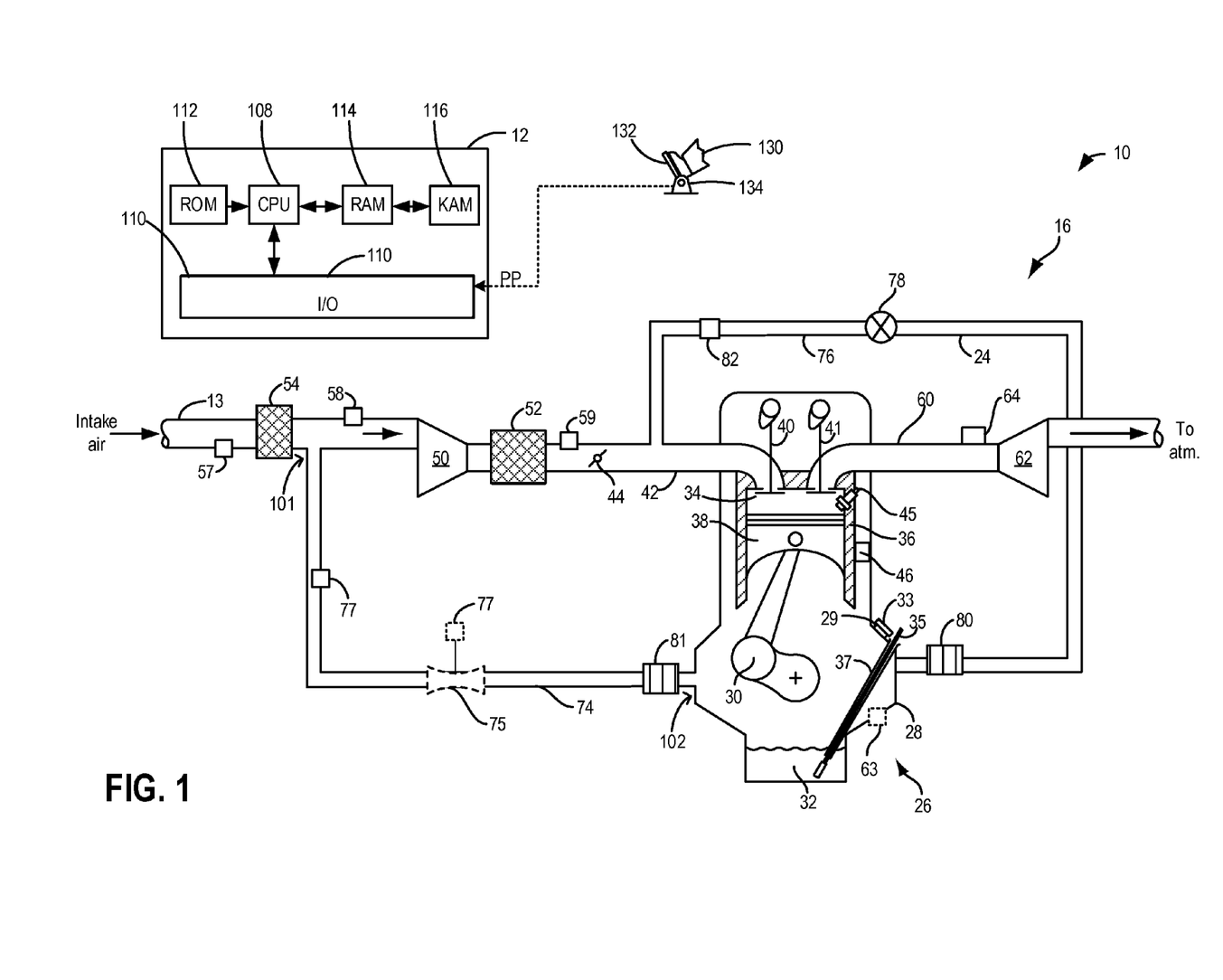
FIG. 1 shows a partial engine view in accordance with the disclosure.
Figure 4:
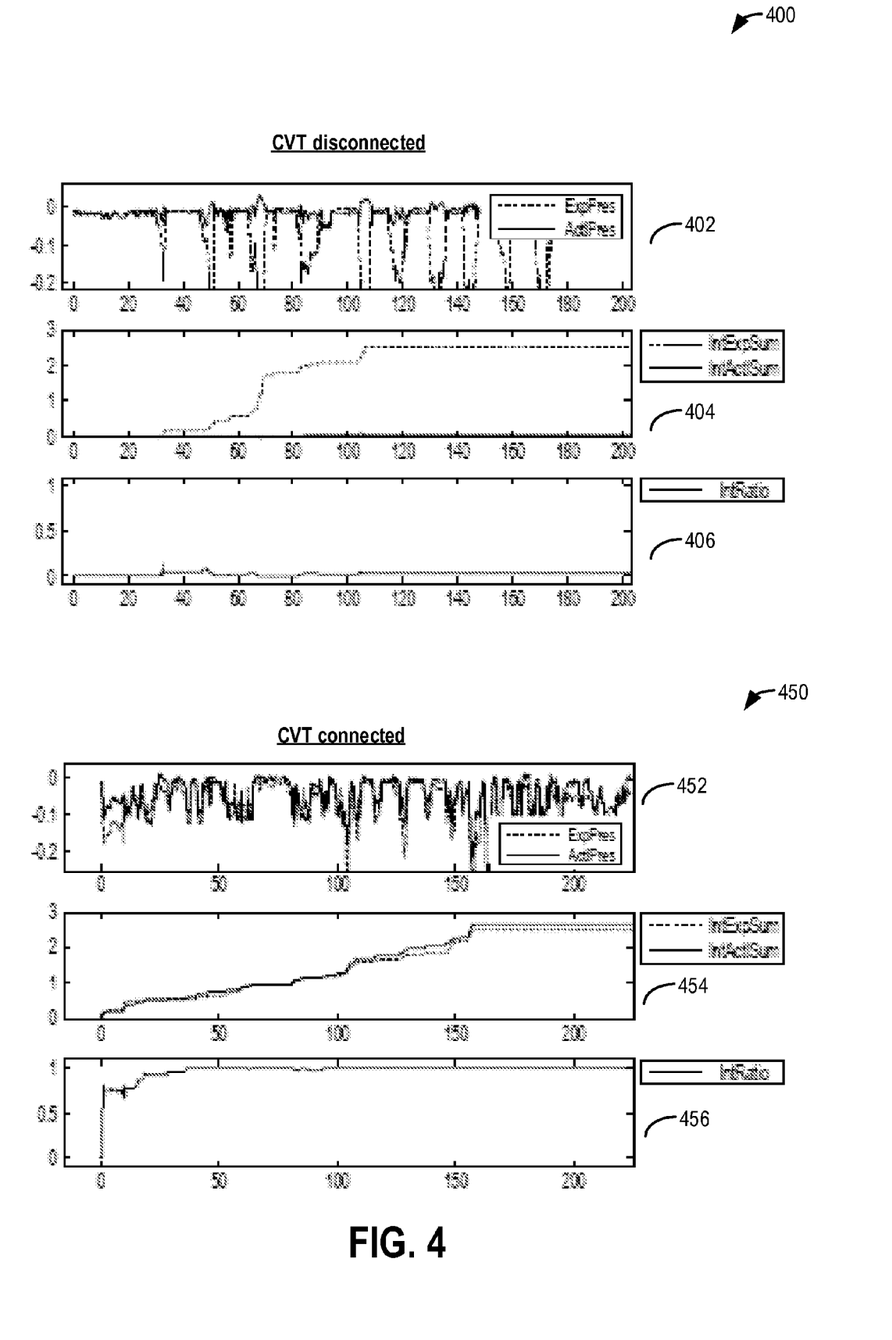
FIG. 4 shows a comparison of example changes in integrated crankcase vent tube pressure in the presence and absence of crankcase breach at an AIS side.
Figure 5:
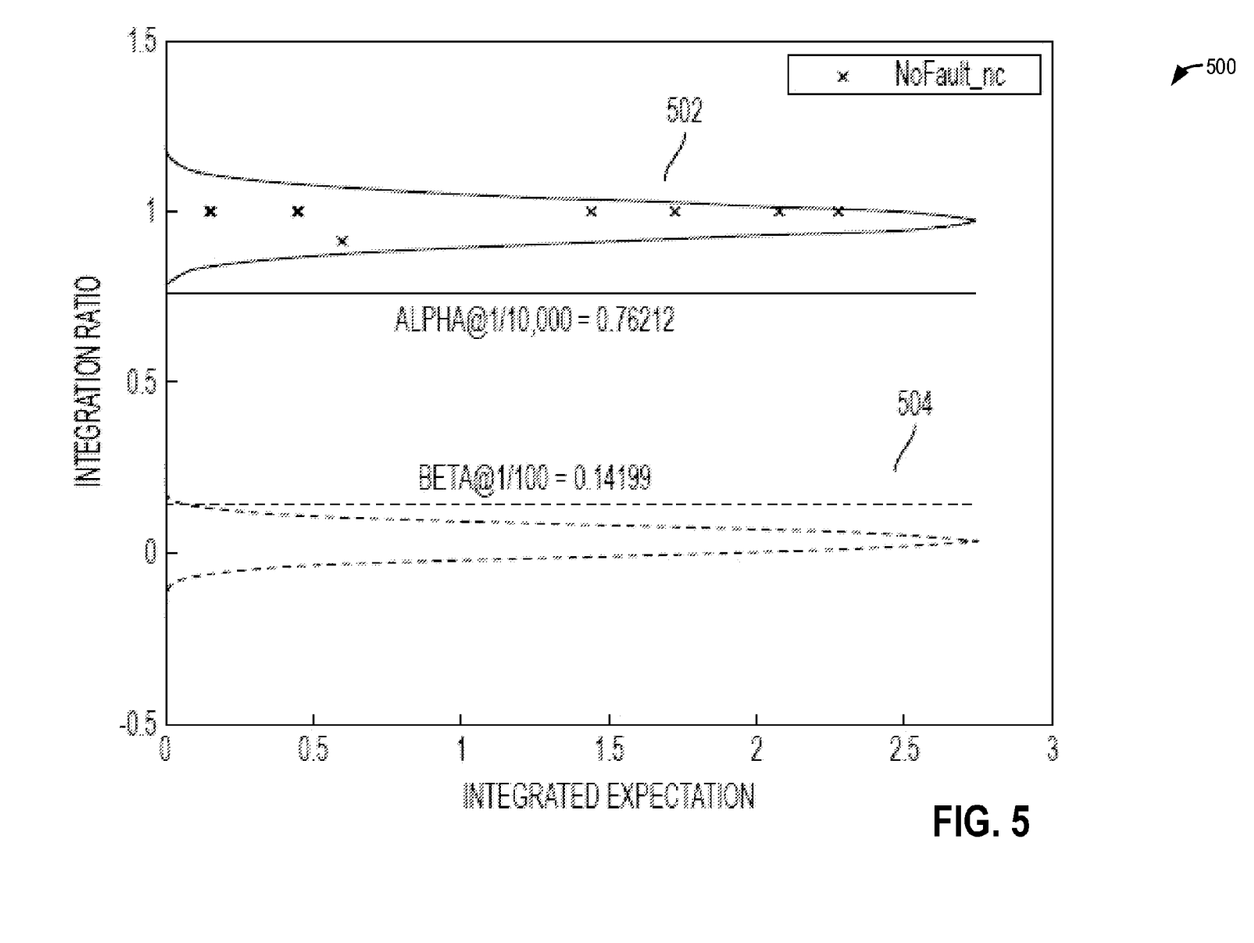
FIG. 5 shows a comparison of integrated ratios with and without correction for a noise floor and with a gain factor.
Figure 6:
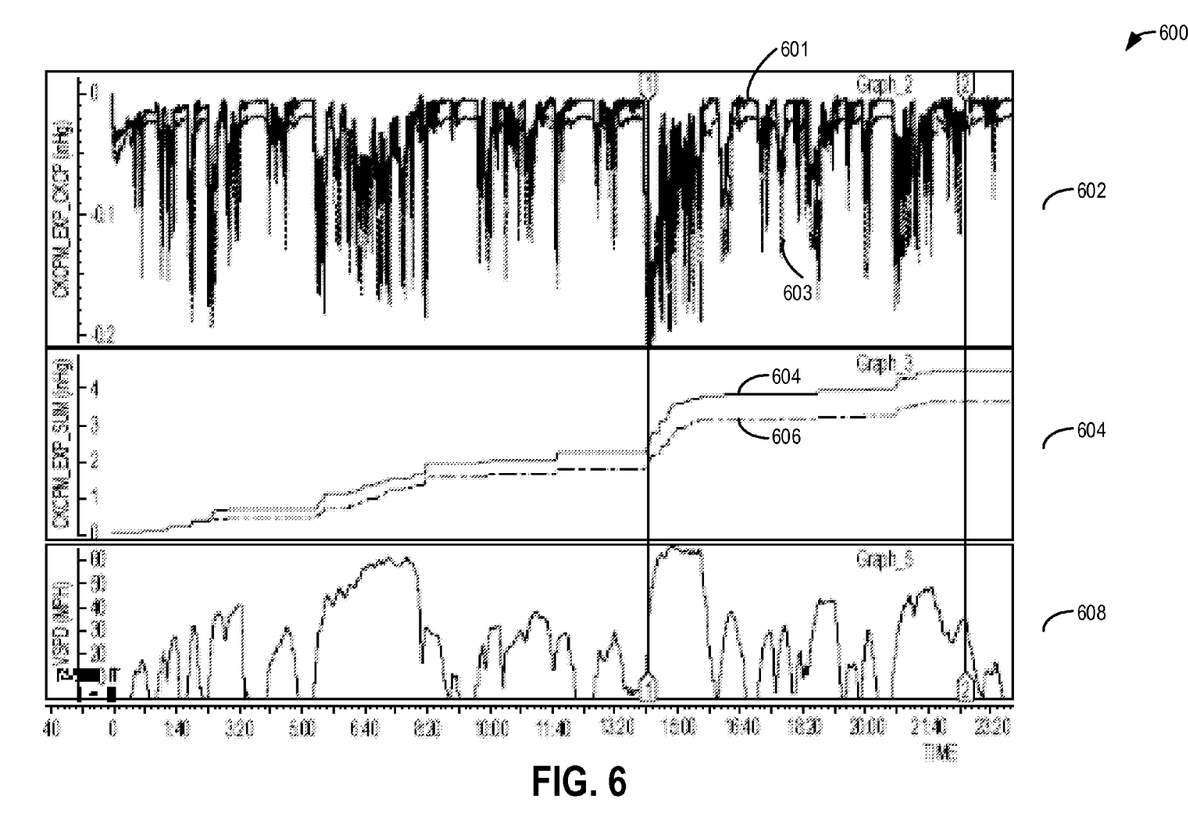
FIG. 6 shows an example running and completion of the crankcase breach detection diagnostic routine within an OBD cycle.
Figure 7:
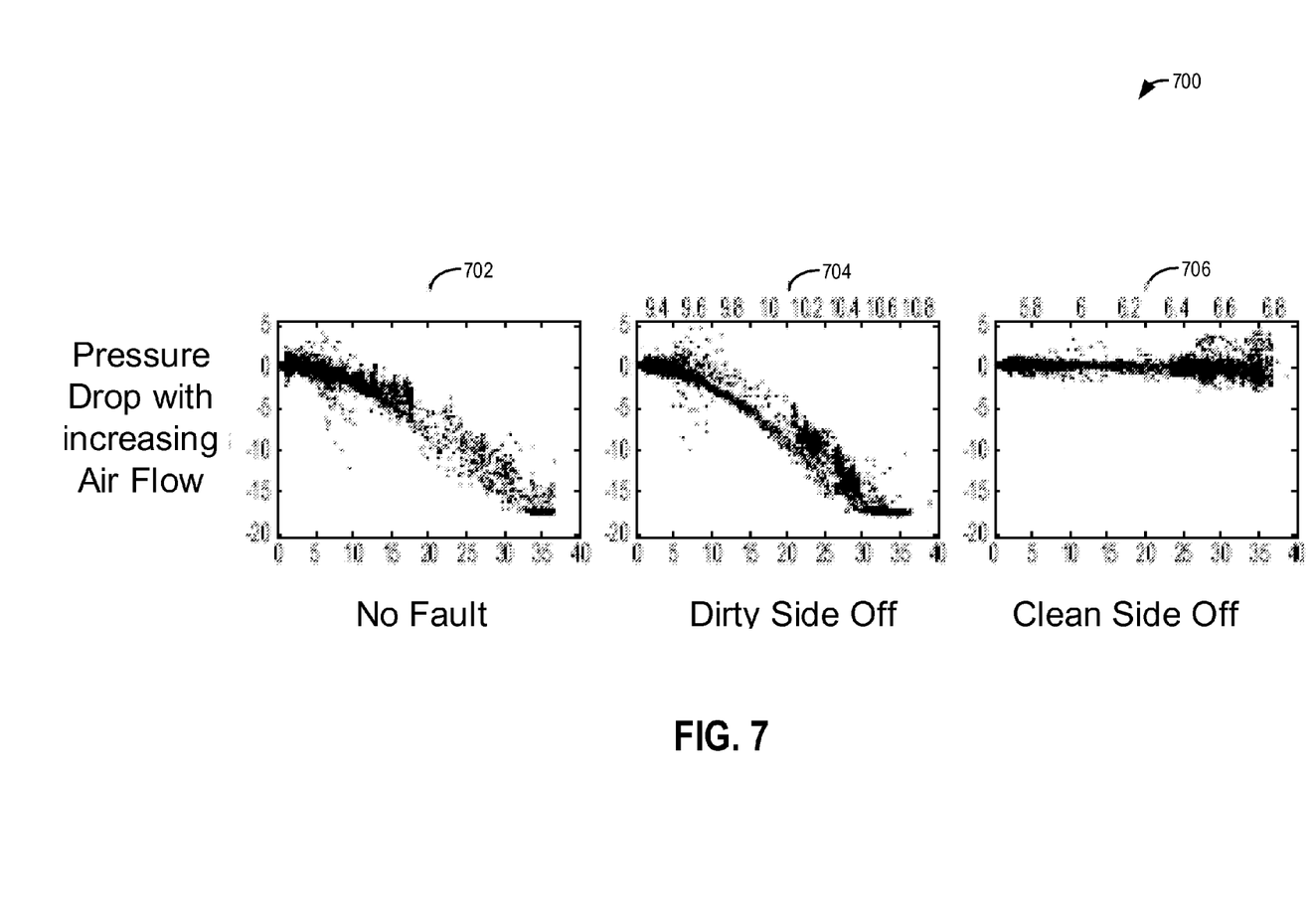
FIG. 7 shows example PCV monitor metrics used to identify and distinguish disconnection of a CVT tube on an AIS side (clean side) from disconnection on a crankcase side (dirty side).

The following description relates to systems and methods for monitoring crankcase ventilation system integrity in an engine crankcase ventilation system, such as the system of FIG. 1. The output of one or more pressure or flow sensors, such as a pressure sensor positioned in a crankcase vent tube of the crankcase ventilation system, may be used to identify crankcase system breach, as well as a location of the breach. An engine controller may be configured to perform a routine, such as the example routine of FIGS. 2-3, to indicate crankcase ventilation system degradation due to disconnection of a crankcase vent tube (CVT) on an AIS side based on changes in crankcase vent tube pressure during engine running even at lower air flow conditions. The controller may integrate actual pressure readings and compare them to integrated expected pressure readings under the same conditions to identify crankcase breach due to vent tube disconnection at the air intake system side (FIGS. 4-6). The integrated pressure readings may also be used to distinguish CVT disconnection on the AIS side from CVT disconnection on the crankcase side (FIG. 7). By using the same sensor to identify degradation in various system components, hardware reduction benefits are achieved without compromising accuracy of detection.

Referring now to FIG. 1, it shows an example system configuration of a multi-cylinder internal combustion engine, generally depicted at 10, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase vent tube 74. A first side 101 of crankcase vent tube 74 may be mechanically coupled, or connected, to fresh air intake passage 13 upstream of compressor 50. In some examples, the first side 101 of crankcase ventilation tube 74 may be coupled to intake passage 13 downstream of air cleaner 54 (as shown). In other examples, the crankcase ventilation tube may be coupled to intake passage 13 upstream of air cleaner 54. A second, opposite side 102 of crankcase ventilation tube 74 may be mechanically coupled, or connected, to crankcase 28 via an oil separator 81.

Crankcase vent tube 74 further includes a sensor 77 coupled therein for providing an estimate about air flowing through crankcase vent tube 74 (e.g., flow rate, pressure, etc.). In one embodiment, crankcase vent tube sensor 77 may be a pressure sensor. When configured as a pressure sensor, sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, a pressure sensor (not shown) may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 42 via a conduit 76 (herein also referred to as PCV line 76). In some examples, PCV line 76 may include a one-way PCV valve 78 (that is, a passive valve that tends to seal when flow is in the opposite direction) to provide continual evacuation of crankcase gases from inside the crankcase 28 before connecting to the intake manifold 42. In one embodiment, the PCV valve may vary its flow restriction in response to the pressure drop across it (or flow rate through it). However, in other examples conduit 76 may not include a one-way PCV valve. In still other examples, the PCV valve may be an electronically controlled valve that is controlled by controller 12. It will be appreciated that, as used herein, PCV flow refers to the flow of gases through conduit 76 from the crankcase to the intake manifold. Similarly, as used herein, PCV backflow refers to the flow of gases through conduit 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 42. Another oil separator 81 may be disposed in conduit 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 42.

The inventors herein have recognized that by positioning pressure sensor 77 in the crankcase vent tube 74, a breach in crankcase system integrity can be detected not only at high engine air flow conditions, but also at low engine air flow conditions based on pull-down of vacuum in the vent tube. At the same time, the crankcase vent tube pressure sensor 77 can also see crankcase pulsations. This allows crankcase system degradation to be identified more accurately while also enabling a location of crankcase system breach to be reliably discerned. As such, since the pressure sensor in the vent tube is used to infer or estimate the presence of air flow through the vent tube, the pressure sensor can also be used as (or interchanged with) a flow meter or a gauge. Thus, in some embodiments, crankcase system breach can also be identified using a flow meter or a venturi in the crankcase vent tube. Since flow through the crankcase vent tube is also affected by the opening/closing of PCV valve 78, the same crankcase vent tube sensor can also be advantageously used to diagnose PCV valve degradation. Further still, since the crankcase vent tube pressure sensor will sense the compressor inlet pressure during engine running conditions when engine air flow is elevated, the need for a CIP sensor can be reduced. In this way, by using an existing crankcase vent tube pressure or air flow sensor of an engine system for diagnosing various engine components, such as a PCV valve, an intake air filter, as well as for crankcase ventilation system breach diagnosis, hardware and software reduction benefits can be achieved in the engine system.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; crankcase vent tube pressure sensor 77, BP sensor 57, CIP sensor 58, TIP sensor 59, etc. Furthermore, controller 12 may monitor and adjust the position of various actuators based on input received from the various sensors. These actuators may include, for example, throttle 44, intake and exhaust valve systems 40, 41, and PCV valve 78. Storage medium read-only memory 112 can be programmed with computer readable data representing instructions executable by processor 108 for performing the methods described below, as well as other variants that are anticipated but not specifically listed. The controller 12 receives signals from the various sensors of FIG. 1 and employs the various actuators of FIG. 1 to adjust engine operation based on the received signals and instructions stored on a memory of the controller. Example methods and routines are described herein with reference to FIGS. 2-3.

In this way, the system of FIG. 1 enables a method for an engine comprising: indicating crankcase ventilation system breach based on an integrated value of actual crankcase vent tube pressure over a duration of steady-state engine airflow relative to an integrated value of expected crankcase vent tube pressure over the duration.

Figure 2:
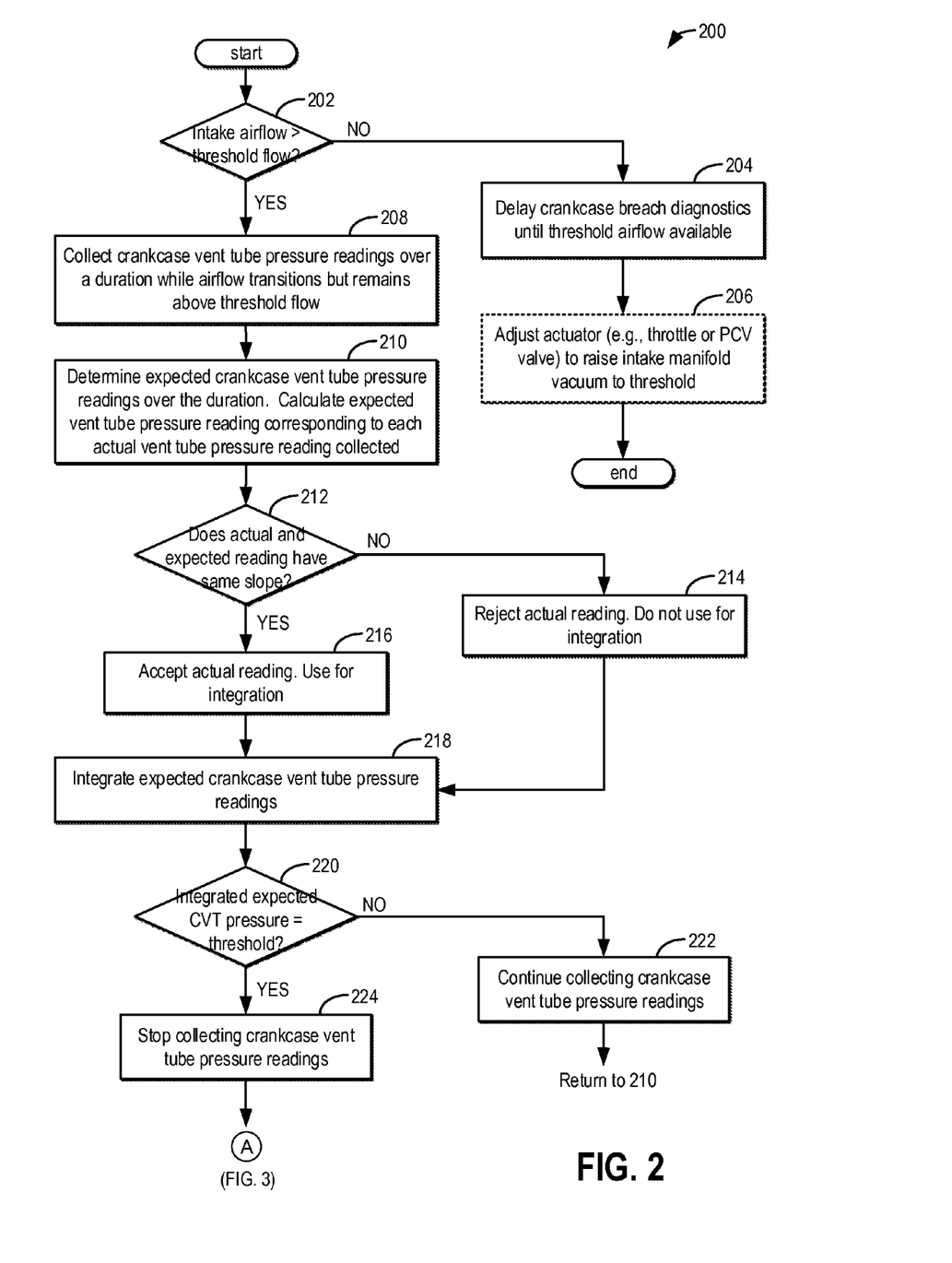
FIGS. 2-3 show high level flow charts for indicating disconnection of a crankcase vent tube on an AIS side based on changes in crankcase vent tube pressure during engine running.
Figure 3:
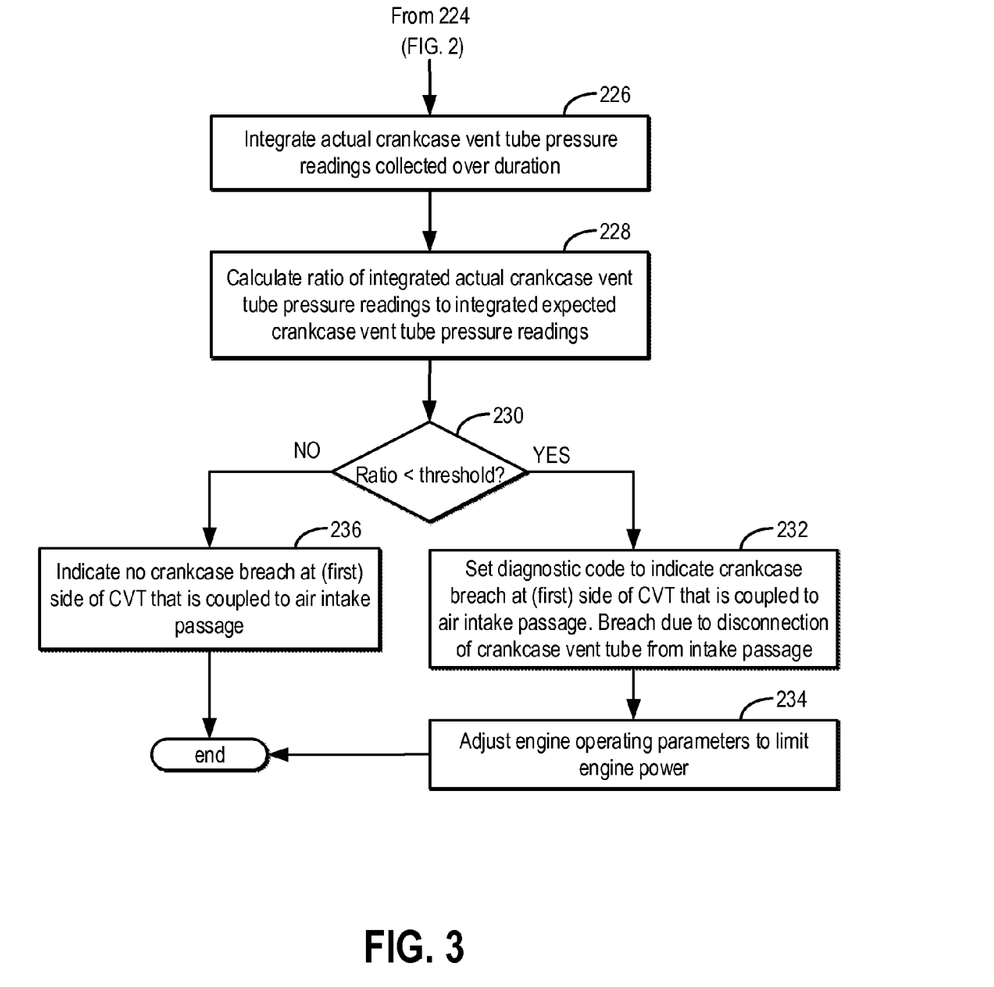

Now turning to FIGS. 2-3, a method 200 is illustrated for indicating breach of a crankcase ventilation system, due to disconnection of a crankcase vent tube/hose on an air induction system side based on changes in crankcase ventilation pressure during engine running. The method allows the breach to be reliably identified even at low airflow conditions. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes confirming that intake airflow is higher than a threshold flow. For example, it may be confirmed that intake airflow is higher than 5 lbm/min. As such, below the threshold air flow level, crankcase breach may not be reliably detected based on crankcase vent tube pressure, as discussed at FIG. 7.

If the intake airflow is not sufficiently high, at 204, the crankcase breach diagnostics may be delayed until the threshold airflow condition is confirmed. Optionally, at 206, the controller may adjust an engine actuator to raise the intake airflow to the threshold level. In one example, the engine actuator that is adjusted may be an intake throttle, wherein the adjusting includes increasing an opening of the throttle. For example, the controller may send a signal to an electromechanical actuator coupled to the throttle, the signal causing the actuator to move the throttle towards a more open position. In another example, the engine actuator that is adjusted may be a PCV valve coupled between the crankcase and the intake manifold, wherein the adjusting includes opening the PCV valve (if the valve is an on/off valve) or increasing an opening of the PCV valve (is the valve is a duty-cycle controlled valve). For example, the controller may adjust a signal corresponding to a duty cycle of the solenoid of the PCV valve to vary the opening of the valve.

If the intake airflow is sufficiently high, at 208, the routine includes collecting actual crankcase vent tube pressure readings over a duration of engine running while the airflow transitions. As such, actual crankcase vent tube (CVT) pressure readings may be collected even as airflow changes. As elaborated below, readings collected during conditions when airflow is transiently below the threshold flow may be rejected and not relied upon for integration analysis. The actual CVT pressure readings may be generated based on the output of one of a pressure sensor, flow sensor, or venturi coupled in the CVT.

At 210, the routine includes determining expected crankcase vent pressure readings over the duration. Specifically, expected vent tube pressure readings corresponding to each of the actual vent tube pressure readings collected may be determined based on engine operating conditions such as engine airflow, engine speed, boost pressure, etc. For example, expected vent tube pressure readings corresponding to each of the actual vent tube pressure readings collected may be determined based on an instantaneous engine airflow estimate, an instantaneous engine At 212, the routine may compare a slope of each collected actual reading to the slope of the corresponding expected reading. Specifically it may be determined if the slope of the actual readings is in the same direction (e.g., same sign) as the slope of the expected readings. If the slope of an actual reading does not match the slope of the expected reading, then at 214, the routine includes rejecting the given actual reading. That is, if an actual reading is decreasing while the expected reading is increasing, the actual reading may not be considered reliable and may be rejected. The routine may then reject that actual reading and not use it for integration. In another example, if the slope of the actual reading is positive while the slope of the expected reading is negative, then the actual reading is rejected and is not used for integration analysis. In alternate examples, it may be determined if the slopes differ by more than an amount. If so, the actual reading may be considered unreliable and rejected. If the actual reading and the expected reading have the same slope, that is, they are both either increasing or both decreasing, then at 216, the routine includes accepting the actual reading and using it for the integration analysis.

As such, the actual CVT readings are collected while the engine airflow is transitioning. If there is a transient drop in engine airflow below the threshold flow (as queried at 202), then the actual CVT reading collected during the below threshold flow condition may also be considered unreliable and rejected. The rejected reading is then excluded from integration. Thus, only readings collected while airflow is above the threshold flow are considered for integration if they meet the slope criteria.

From each of 216 and 214, the routine proceeds to 218, wherein the expected crankcase vent tube pressure readings collected thus far are integrated. At 220, the integrated expected crankcase vent tube pressure is compared to a threshold. Specifically, it may be determined if the integrated value of the expected crankcase vent tube pressure is at or above a threshold. The threshold may be indicative of sufficient (e.g., minimum) air flow through the crankcase that allows for a sufficient pressure drop to be enabled. The threshold may be adjusted based on barometric pressure to compensate for differences in pressure and airflow at different altitudes. For example, the threshold may be decreased as the barometric pressure increases. As such, by confirming that the integrated expected crankcase vent tube pressure is higher than the threshold, the diagnostic for crankcase breach detection is rendered more accurate and reliable.

If the integrated expected crankcase vent tube pressure is less than the threshold, then at 222 the routine continues collecting actual and expected vent tube pressure readings. The routine then returns to 210. If however the integrated expected vent tube pressure is higher than the threshold, then at 224 the routine includes discontinuing collecting actual and expected crankcase vent tube pressure readings. In particular, based on the integrated expected crankcase vent tube pressure being higher than the threshold, it may be determined that sufficient air flow has occurred for the actual crankcase vent tube pressure readings to be integrated and analyzed.

The routine then continues to 226 (FIG. 3) where the actual crankcase vent tube pressure readings are integrated over the duration for which they were collected. The integration includes applying a gain factor (e.g., adder or multiplier) on the pressure change for weighting the contribution of the CVT pressure sensor. In addition, the integration includes applying a noise floor. The integration may be represented as the equation:

$$ActlPresSum=MAX(0,(ActlPresSumPrev+ actl\_gain*ABS(ActlPresChg-ActlPresChgPrv)- nfloor));$$

wherein ActlPresSum is the integrated value of the actual pressure readings, ActlPresSumPrev is the most recent actual pressure reading, actl_gain is the gain factor, ActlPresChg is the current change in pressure reading, ActlPresChgPrev is the last change in pressure reading, and nfloor is the noise floor applied. As elaborated with reference to FIG. 5, by adjusting the integration with the gain factor and the noise floor, the contribution of the pressure sensors may be increased and given higher weightage. As such, this improves the separation of the results between a final clipped range of values. This allows a fault and a no-fault condition to be better distinguished, as elaborated below. In addition, variations in pressure readings on a given vehicle are better compensated for.

Next, at 228, the routine calculates a ratio of the integrated actual crankcase vent tube pressure readings to the integrated expected crankcase vent tube pressure readings. At 230, the determined ratio is compared to a threshold. The threshold may be adjusted as a function of barometric pressure, the threshold increased as the barometric pressure increases. Specifically, at 230, it may be determined if the ratio is less than a threshold. If the ratio is not less than the threshold, then at 236, it may be determined that no crankcase breach has occurred at a first side of the CVT that is coupled to the air intake passage. That is, it may be indicated that the CVT is not disconnected on the clean side coupled to the air intake passage.

If the ratio is lower than the threshold, then at 232, the routine includes indicating crankcase breach at the first side of the CVT. Specifically, a diagnostic code may be set to indicate that the CVT is disconnected on the clean side, that is, the side coupled to the air intake passage. At 234, one or more engine operating parameters may be adjusted to limit the engine power in the view of the indication of crankcase breach on the first side. For example, engine boost output may be limited by increasing the opening of an exhaust wastegate coupled across a turbine, or increasing the opening of a compressor bypass valve coupled across an intake compressor.

FIG. 4 shows an example of detection of crankcase breach due to CVT disconnection on the clean side based on correlations between expected airflow through the CVT relative to actual airflow through the CVT. Map 400 shows an example correlation during conditions when the CVT is disconnected. Map 450 shows an example correlation during conditions when the CVT is connected. In each map, the top graph (plots 402, 452) depicts actual pressure readings (solid line) relative to expected pressure readings (dashed line), the middle graph (plots 404, 454) depicts integrated actual pressure readings (solid line) relative to integrated expected pressure readings (dashed line), and the bottom graph (plots 406, 456) detects a ratio of the integrated actual pressure readings relative to the integrated expected pressure readings.

As can be seen by comparing plots 402 and 452, during conditions when the CVT is connected on the clean side, changes in actual pressure reading better correlate to those of the expected pressure reading. Consequently, the integrated sum of the actual pressure reading better correlates with the integrated sum of the expected pressure reading (see plots 404 and 454). This results in the integrated ratio being higher than a threshold, and approaching 1, when the CVT is connected while the integrated ratio remains below the threshold, and approaching 0, when the CVT is disconnected.

FIG. 5 shows an example of how the integration ratio is adjusted with a gain factor to add robustness and reduce the likelihood of false calls. The gain factor is associated with the actual pressure measurement and not the expected measurement. This way the gain has little effect on the pressure measurements of a disconnected PCV fresh air hose since that value is so small. Increasing the gain factor above a value of one can be used to both push the mean of the NoFault distribution towards 1, while reducing its standard deviation. This results in increased separation between the faulted (AIS side hose disconnected) and non-faulted integration ratios.

In this way, crankcase breach on the air intake passage side may be determined more reliably even at low air flows. By relying on actual and expected pressure readings estimated and integrated over a duration of the low air flow, the diagnostic may be completed over a shorter duration without reducing accuracy of the results. As such, this allows crankcase breach diagnostics to be completed over an OBD demonstration cycle. For example, as shown with reference to FIG. 6, with an expected sum of 2.5 and at air flows above 5 lbm/min, the diagnostic may be completed at 14:20 min into an OBD cycle (specifically the California Unified Cycle). In comparison, diagnostics not relying on the integrated values may not be completed on the standard OBD demonstration cycle for high power-to-weight ratio vehicles due to the lack of engine operation at the high air flow levels.

FIG. 7 shows a map 700 detecting changes in pressure drop in the CVT with increasing air flow. Plot 702 shows the pressure drop experienced in the presence of no fault, plot 704 shows the pressure drop experienced when the CVT is disconnected on the second side coupled to the crankcase (that is, the dirty side), and plot 706 shows the pressure drop experienced when the CVT is disconnected on the first side coupled to the air intake passage (that is, the clean side). Each plot shows increase in air flow across the X axis.

When the PCV vent hose is disconnected at the AIS (Clean Side Off), the CVT does not see an increasing vacuum with increasing air flow (plot 706) as expected when the hose is connected (plot 702). This pressure drop is generated from the air flow in the AIS when connected and the fact that the PCV valve is closed on the intake manifold side of the crank case (no pressure contribution in the hose from the crank case under this condition). This lack of pressure drop signal is used to indicate hose disconnect in the pressure correlation test described herein. The crankcase pressure is linearly regressed during normal driving where pressure samples are collected in higher airflow regions. Once a calibratable number of data samples are collected, the slope of the regressed lined is compared to a threshold to determine if the PCV hose is disconnected from the air intake system. Specifically, it may be indicated that the PCV hose is faulted on the clean side if the slope is near zero.

As can be seen by comparing the plots, a substantial change in pressure is experienced in the CVT at higher air flows in the presence of no fault or when the dirty side is off. In comparison, no pressure drop is experienced when the CVT is disconnected on the clean side. As such, the experienced pressure drop is substantial at higher air flows as compared to lower air flows, resulting in the lower reliability of the diagnostic at lower air flows. As discussed herein, by using the integrated pressure readings, crankcase breach detection at lower air flows is improved.

It will be appreciated that changes in CVT pressure estimated during specific conditions, such as during an engine start and after engine crank, may also be used to reliably identify crankcase breach on the second, dirty side of the CVT. For example, different crank throttle profiles creating different crank manifold pressure pull-downs maybe used to identify CVT disconnection on the dirty side. A controller may start and stop looking for a dip in CVT pressure based on feedback from a MAP sensor. By detecting the dip properly via MAP measurement instead of reliance on an open-loop the timer, and by further integrating the dip/pulse during the determined time frame, consistent results may be achieved for the monitor metric. For example, the integration may allow for better distinction between fault and no fault conditions, thereby reducing the occurrence of false calls.

As such, with the stuck closed (or sticky at crank only) PCV valve, the vent tube pressure sensor may see more pulsation and a slight positive (rather than a dip or flat) pressure indicating an operational PCV. This may lead to confounding results which may reduce the ability of a controller to distinguish fault and no fault. By taking into account the pulsation with positive pressure when a PCV valve is stuck closed, the controller may look for a positive pulse and angle, thereby clearing that no fault case. In particular, the no fault condition with the stuck PCV valve may generate pulse vs. dip raw data that is significantly into the negative quadrant of a poll are angle map.

During specific test conditions, CVT pressure changes may be used to identify crankcase breach on the crankcase side (dirty side). Specifically, during crank and engine run-up and prior to entering "run" mode (that is, at low manifold vacuum), the following may be calculated: a dip metric which is the pressure signal corrected for any sensor offset and integrated; a pressure pulse metric which is the calculated amplitude of the pressure pulse signal. The test conditions may include one or more of vehicle speed being lower than a threshold (e.g., Zero vehicle speed), a minimum soak time having elapsed (e.g., around 1 minute), ambient temperature being above a threshold (e.g., above 20° F.), altitude being below a threshold (e.g., below 8000 feet), the vehicle not being in an idle stop mode or an engine pull-down mode, and no degradation of the CVT pressure sensor or the MAP sensor being indicated. As such, the CVT pressure sensor is expected to read a vacuum in the crankcase during the crank and run-up period. This vacuum is the result of the PCV valve transitioning open due to the increased intake manifold vacuum during the engine run-up. This vacuum "dip" signal along with the pressure pulsation signal indicates that the PCV fresh air hose is connected at the dirty/crankcase side. Hence, the diagnostic requires the PCV valve to actually open during this crank and run-up period. As such, proper PCV valve open operation during high manifold vacuum and PCV valve closed operation during hot charcoal and boosted conditions is expected. However under some circumstances the PCV valve may not open enough for the CVT pressure sensor to see vacuum in the crankcase. Under these conditions, the diagnostic could interpret the lack of vacuum signal as a disconnected fresh air hose (a false MIL).

Thus, a PCV monitor may set the following diagnostic codes. A first diagnostic code may be set to indicate that the crankcase pressure sensor circuit is out of range and not performing as expected. An offset may be checked prior to engine crank (herein the sensor offset may be higher than a threshold). In addition, the sensor may read barometric pressure at low air flows (herein the sensor reading may be lower than a threshold). A second diagnostic code may be set to indicate the crankcase pressure sensor circuit is low. A third diagnostic code may be set to indicate the crankcase pressure sensor circuit is high. A fourth diagnostic code may be set to indicate that the crankcase ventilation system is disconnected. This fourth diagnostic may include a one shot test performed during engine crank and run up to diagnose if the PCV fresh air hose is disconnected at the crankcase (dirty side). Further, the fourth diagnostic may include a continuously operating test performed to diagnose if the PCV fresh air hose is disconnected at the engine air intake (clean side).

Based on the diagnostic code that is set, the controller may perform distinct control actions. For example, different control actions may be performed in response to the first diagnostic code and an indication that the crankcase pressure sensor circuit is out of range and not performing as expected, as compared to in response to the second diagnostic code and an indication that the crankcase pressure sensor circuit is low, or in response to the third diagnostic code and an indication that the crankcase pressure sensor circuit is high. As another example, in response to the fourth diagnostic code and an indication that the crankcase ventilation system is disconnected (on the clean side), the controller may limit an engine boost or torque output.

One example method comprises: indicating crankcase ventilation system breach based on an integrated value of actual crankcase vent tube pressure over a duration of steady-state engine airflow relative to an integrated value of expected crankcase vent tube pressure over the duration. In the preceding example, the indicating may additionally or optionally include indicating crankcase ventilation system breach due to disconnection of a crankcase vent tube on an air intake side. In any or all of the preceding examples, the indicating may additionally or optionally be based on a ratio of the integrated value of actual crankcase vent tube pressure over the duration of steady-state engine airflow relative to the integrated value of expected crankcase vent tube pressure, the crankcase ventilation system breach on the air intake side indicated in response to the ratio being lower than a threshold. In any or all of the preceding examples, the method may additionally or optionally further comprise, in response to the indicating, adjusting an engine actuator to limit engine power. In any or all of the preceding examples, the duration of steady-state engine airflow may additionally or optionally include a duration of steady-state engine airflow being higher than a threshold flow. In any or all of the preceding examples, the duration may be additionally or optionally based on the integrated value of expected crankcase vent tube pressure. In any or all of the preceding examples, the duration being based on the integrated value of expected crankcase vent tube pressure may additionally or optionally include: collecting actual vent tube pressure readings until the integrated value of expected crankcase vent tube pressure exceeds a threshold, and then discontinuing collecting actual vent tube pressure reading. Any or all of the preceding example methods may additionally or optionally further comprise, comparing a first slope of each collected actual crankcase vent tube pressure reading to a second slope of a corresponding expected crankcase vent tube pressure reading; and in response to a direction of the first slope of a given collected actual crankcase vent tube pressure reading not matching a direction of the second slope, rejecting the given collected actual crankcase vent tube pressure reading and not including the rejected reading in the integrated value of the actual crankcase vent tube pressure. Any or all of the preceding example methods may additionally or optionally further comprise: estimating the steady-state engine airflow while collecting each actual crankcase vent tube pressure reading; and in response to the estimated steady-state engine airflow being lower than the threshold flow when collecting a given actual crankcase vent tube pressure reading, rejecting the given collected actual crankcase vent tube pressure reading and not including the rejected reading in the integrated value of the actual crankcase vent tube pressure. In any or all of the preceding example methods, the actual vent tube pressure may be additionally or optionally estimated by one of a pressure sensor, a flow sensor, and a venturi coupled in the crankcase vent tube, and the expected vent tube pressure may be may additionally or optionally estimated by an engine controller based on engine airflow.

Another example method for an engine, comprises: over a duration of steady-state engine airflow, collecting a plurality of actual crankcase vent tube pressure readings while estimating corresponding expected crankcase vent tube pressure readings; and after the duration, integrating each of the collected plurality of actual crankcase vent tube pressure readings and the estimated corresponding expected crankcase vent tube pressure readings. The preceding example method may additionally or optionally further include indicating disconnection of a crankcase vent tube based on a ratio of a first integrated value of the actual pressure readings relative to a second integrated value of the estimated pressure readings being lower than a threshold. In any or all of the preceding example methods, the duration may additionally or optionally correspond to a duration when the second integrated reaches a threshold value. Any or all of the preceding example methods may additionally or optionally further comprise: rejecting one or more of the collected plurality of actual crankcase vent tube pressure readings in response to steady-state engine airflow being lower than a threshold airflow during the collecting or a slope of a collected actual crankcase vent tube pressure reading not matching a slope of a corresponding estimated crankcase vent tube pressure reading. In any or all of the preceding example methods, the rejecting may additionally or optionally include: excluding the rejected readings from the integrating. In any or all of the preceding example methods, the indicating may additionally or optionally include setting a diagnostic code to indicate disconnection of the crankcase vent tube on a first side where the vent tube is coupled to an air intake passage of the engine. Any or all of the preceding example methods may additionally or optionally further comprise, in response to the indication, limiting engine boost.

As yet another example, a method for an engine may comprise: indicating disconnection of a crankcase vent tube on a first side based on an integrated value of actual crankcase vent tube pressure readings collected over a first duration of steady-state engine airflow; and indicating disconnection of the crankcase vent tube on a second, opposite side based on an integrated value of actual vent tube pressure readings collected over a second duration of engine cranking and run-up. In the preceding example, the first side additionally or optionally is a side where the crankcase vent tube is coupled to an air intake passage, and the second side is additionally or optionally a side where the crankcase vent tube is coupled to a crankcase. In any or all of the preceding example methods, the integrated value of actual crankcase vent tube pressure readings collected over a first duration of steady-state engine airflow additionally or optionally includes a first integrated change, the first integrated change including a first integrated rise in crankcase vent tube pressure, wherein the integrated value of actual vent tube pressure readings collected over a second duration of engine cranking and run-up includes a second integrated change, the second integrated change including a transient dip. In any or all of the preceding example methods, indicating disconnection on the first side is additionally or optionally further based on an integrated value of expected crankcase vent tube pressure readings corresponding to the actual crankcase vent tube pressure reading collected over the first duration; and wherein the indicating disconnection on the second side is further based on an integrated value of expected crankcase vent tube pressure readings corresponding to the actual crankcase vent tube pressure reading collected over the second duration.

In this way, by positioning a pressure sensor within a crankcase vent tube, changes in pressure and air flow through the vent tube can be monitored, while packaging the sensor in a cost-efficient manner. By correlating the estimated changes in vent tube pressure with expected values, and further by integrating the actual and expected values, crankcase system integrity may be reliably indicated. By relying on a comparison of the integrated change in actual pressure reading to the integrated change in expected pressure reading, disconnection of a CVT on the air intake system side can be reliably determined at lower engine airflows and in the shorter time of OBD cycles. In addition, by relying on the characteristics of integrated crankcase vent tube pressure and flow data during engine cranking as well as engine running, breaches in the crankcase ventilation system located at a side of the vent tube coupled to an air intake passage can be better distinguished from those occurring at a side of the vent tube coupled to a crankcase.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   indicating crankcase ventilation system breach based on an integrated value of actual crankcase vent tube pressure over a duration of transient engine airflow relative to an integrated value of expected crankcase vent tube pressure over the duration.

2. The method of claim 1, wherein the indicating includes indicating crankcase ventilation system breach due to disconnection of a crankcase vent tube on an air intake side.

3. The method of claim 2, wherein the indicating is based on a ratio of the integrated value of actual crankcase vent tube pressure over the duration of steady-state engine airflow relative to the integrated value of expected crankcase vent tube pressure, the crankcase ventilation system breach on the air intake side indicated in response to the ratio being lower than a threshold.

4. The method of claim 3, further comprising, in response to the indicating, adjusting an engine actuator to limit engine power.

5. The method of claim 2, wherein the duration of transient engine airflow includes a duration of transient engine airflow being higher than a threshold flow.

6. The method of claim 5, wherein the duration is based on the integrated value of expected crankcase vent tube pressure.

7. The method of claim 6, wherein the duration being based on the integrated value of expected crankcase vent tube pressure includes:
   collecting actual vent tube pressure readings until the integrated value of expected crankcase vent tube pressure exceeds a threshold, and then discontinuing collecting actual vent tube pressure reading.

8. The method of claim 7, further comprising,
   comparing a first slope of each collected actual crankcase vent tube pressure reading to a second slope of a corresponding expected crankcase vent tube pressure reading; and
   in response to a direction of the first slope of a given collected actual crankcase vent tube pressure reading not matching a direction of the second slope, rejecting the given collected actual crankcase vent tube pressure reading and not including the rejected reading in the integrated value of the actual crankcase vent tube pressure.

9. The method of claim 8, further comprising,
   estimating the transient engine airflow while collecting each actual crankcase vent tube pressure reading; and
   in response to the estimated transient engine airflow being lower than the threshold flow when collecting a given actual crankcase vent tube pressure reading, rejecting the given collected actual crankcase vent tube pressure reading and not including the rejected reading in the integrated value of the actual crankcase vent tube pressure.

10. The method of claim 1, wherein the actual vent tube pressure is estimated by one of a pressure sensor, a flow sensor, and a venturi coupled in the crankcase vent tube, and wherein the expected vent tube pressure is estimated by an engine controller based on engine airflow.

11. A method for an engine, comprising:
    over a duration of transient engine airflow,
    collecting a plurality of actual crankcase vent tube pressure readings while estimating corresponding expected crankcase vent tube pressure readings; and
    after the duration,
       integrating each of the collected plurality of actual crankcase vent tube pressure readings and the estimated corresponding expected crankcase vent tube pressure readings; and
       indicating disconnection of a crankcase vent tube based on a ratio of a first integrated value of the actual pressure readings relative to a second integrated value of the estimated pressure readings being lower than a threshold.

12. The method of claim 11, wherein the duration corresponds to a duration when the second integrated reaches a threshold value.

13. The method of claim 12, further comprising,
    rejecting one or more of the collected plurality of actual crankcase vent tube pressure readings in response to transient engine airflow being lower than a threshold airflow during the collecting or a slope of a collected actual crankcase vent tube pressure reading not matching a slope of a corresponding estimated crankcase vent tube pressure reading.

14. The method of claim 13, wherein the rejecting includes excluding the rejected readings from the integrating.

15. The method of claim 14, wherein the indicating includes setting a diagnostic code to indicate disconnection of the crankcase vent tube on a first side where the vent tube is coupled to an air intake passage of the engine.

16. The method of claim 15, further comprising, in response to the indication, limiting engine boost.

17. A method for an engine, comprising:
    indicating disconnection of a crankcase vent tube on a first side based on an integrated value of actual crankcase vent tube pressure readings collected over a first duration of transient engine airflow; and
    indicating disconnection of the crankcase vent tube on a second, opposite side based on an integrated value of actual vent tube pressure readings collected over a second duration of engine cranking and run-up.

18. The method of claim 17, wherein the first side is a side where the crankcase vent tube is coupled to an air intake passage, and wherein the second side is a side where the crankcase vent tube is coupled to a crankcase.

19. The method of claim 18, wherein the integrated value of actual crankcase vent tube pressure readings collected over a first duration of steady-state engine airflow includes a first integrated change, the first integrated change including a first integrated rise in crankcase vent tube pressure, and wherein the integrated value of actual vent tube pressure readings collected over a second duration of engine cranking and run-up includes a second integrated change, the second integrated change including a transient dip.

20. The method of claim 17, wherein the indicating disconnection on the first side is further based on an integrated value of expected crankcase vent tube pressure readings corresponding to the actual crankcase vent tube pressure reading collected over the first duration; and wherein the indicating disconnection on the second side is further based on an integrated value of expected crankcase vent tube pressure readings corresponding to the actual crankcase vent tube pressure reading collected over the second duration.

* * * * *